(12) United States Patent
Wang et al.

(10) Patent No.: US 12,316,063 B2
(45) Date of Patent: May 27, 2025

(54) OUTPUT LIGHT BEAM FORMATION APPARATUS

(71) Applicant: Cymer, LLC, San Diego, CA (US)

(72) Inventors: Yuda Wang, San Diego, CA (US); Rostislav Rokitski, San Diego, CA (US)

(73) Assignee: Cymer, LLC, San Diego, CA (US)

( * ) Notice: Subject to any disclaimer, the term of this patent is extended or adjusted under 35 U.S.C. 154(b) by 682 days.

(21) Appl. No.: 17/614,733

(22) PCT Filed: May 21, 2020

(86) PCT No.: PCT/US2020/034057
§ 371 (c)(1),
(2) Date: Nov. 29, 2021

(87) PCT Pub. No.: WO2020/256885
PCT Pub. Date: Dec. 24, 2020

(65) Prior Publication Data
US 2022/0224069 A1     Jul. 14, 2022

Related U.S. Application Data (60) Provisional application No. 62/863,980, filed on Jun. 20, 2019, provisional application No. 62/916,462, filed on Oct. 17, 2019.

(51) Int. Cl.
*H01S 3/22*     (2006.01)
*H01S 3/00*     (2006.01)
(Continued)

(52) U.S. Cl.
CPC ............ *H01S 3/005* (2013.01); *H01S 3/1003* (2013.01); *H01S 3/101* (2013.01); *H01S 3/225* (2013.01); *H01S 3/2207* (2013.01); *H01S 3/2333* (2013.01)

(58) Field of Classification Search
CPC ........ H01S 3/005; H01S 3/1003; H01S 3/101; H01S 3/225; H01S 3/2207; H01S 3/2333; H01S 3/0071
See application file for complete search history.

(56) References Cited

U.S. PATENT DOCUMENTS 5,048,926 A    9/1991   Tanimoto
6,067,311 A    5/2000   Morton et al.
(Continued)

FOREIGN PATENT DOCUMENTS

CN    103123419 A    5/2013
CN    103998859 A    8/2014
(Continued)

OTHER PUBLICATIONS

Patrik Flierl, European International Searching Authority, International Search Report and Written Opinion, counterpart PCT Application No. PCT/US2020/034057, mailed Sep. 2, 2020, 9 pages total.
(Continued)

*Primary Examiner* — Kinam Park
(74) *Attorney, Agent, or Firm* — DiBerardino McGovern IP Group LLC (57) ABSTRACT

An apparatus includes: a beam splitter on a beam path, the beam splitter configured to receive light from a deep ultraviolet (DUV) light source; and a first plurality of reflective optical elements on the beam path. The beam splitter is configured to direct a portion of the light received from the DUV light source toward the first plurality of reflective optical elements; the first plurality of reflective optical elements is configured to rotate a divergence of the portion of the light to produce rotated light; and the beam splitter is configured to direct the rotated light and a portion of the light received from the DUV light source onto an output beam path.

23 Claims, 5 Drawing Sheets

(51) Int. Cl.
  *H01S 3/10* (2006.01)
  *H01S 3/101* (2006.01)
  *H01S 3/225* (2006.01)
  *H01S 3/23* (2006.01)

(56) References Cited

U.S. PATENT DOCUMENTS

| | | | | |
|---|---|---|---|---|
| 6,549,555 | B2* | 4/2003 | Serwazi | H01S 3/134 372/27 |
| 6,868,106 | B1* | 3/2005 | Vogler | H01S 3/225 372/90 |
| 8,908,735 | B2* | 12/2014 | Ershov | H01S 3/225 372/57 |
| 9,470,397 | B2 | 10/2016 | Gadegaard et al. | |
| 2002/0126479 | A1 | 9/2002 | Zhai et al. | |
| 2003/0117601 | A1 | 6/2003 | Kudo | |
| 2003/0219056 | A1* | 11/2003 | Yager | G03F 7/70041 372/57 |
| 2004/0022291 | A1* | 2/2004 | Das | G02B 26/0816 372/55 |
| 2006/0146384 | A1 | 7/2006 | Schultz | |
| 2008/0165337 | A1* | 7/2008 | Ershov | G03F 7/70625 430/322 |
| 2008/0225904 | A1* | 9/2008 | Brown | H01S 3/225 372/25 |
| 2012/0002687 | A1* | 1/2012 | Ershov | H01S 3/225 372/20 |
| 2013/0327963 | A1 | 12/2013 | Lambert et al. | |
| 2016/0341602 | A1 | 11/2016 | Thornes | |
| 2018/0066995 | A1 | 3/2018 | Bibby et al. | |
| 2018/0081278 | A1 | 3/2018 | Nikipelov et al. | |
| 2019/0288472 | A1 | 9/2019 | Onose | |

FOREIGN PATENT DOCUMENTS

| | | |
|---|---|---|
| CN | 106291961 A | 1/2017 |
| CN | 109844612 A | 6/2019 |
| JP | H01220825 A | 9/1989 |
| JP | 2005525001 A | 8/2005 |
| JP | 2012156531 A | 8/2012 |
| KR | 2005-0010786 A | 1/2005 |
| WO | 2003100826 A2 | 12/2003 |
| WO | 2011064059 A1 | 6/2011 |
| WO | 2018075246 A1 | 4/2018 |
| WO | 2018138819 A1 | 8/2018 |
| WO | 2019072637 A2 | 4/2019 |

OTHER PUBLICATIONS

Office Action, counterpart Korean Patent Application No. 10-2021-7040293, mailed Feb. 23, 2023, 9 pages total (including English translation of 4 pages).

Zhang Xin et al, Latest Advances in Deep Ultraviolet Coherent Source, Technical Institute of Physics and Chemistry of China Academy of Science, Beijing, 2009, 4 total pages (including English translation of 3 pages).

Office Action, counterpart Japanese Patent Application No. 2021-568771, mailed Jan. 20, 2023, 11 pages total (including English translation of 6 pages).

* cited by examiner

OUTPUT LIGHT BEAM FORMATION APPARATUS

CROSS REFERENCE TO RELATED APPLICATIONS

This application claims priority to U.S. Application No. 62/863,980, filed Jun. 20, 2019 and titled OUTPUT LIGHT BEAM FORMATION APPARATUS, and U.S. Application No. 62/916,462, filed Oct. 17, 2019 and titled OUTPUT LIGHT BEAM FORMATION APPARATUS, both of which are incorporated herein in their entireties by reference.

TECHNICAL FIELD

This disclosure relates to an output light beam formation apparatus. The output light beam formation apparatus may be used with, for example, a deep ultraviolet light (DUV) source.

BACKGROUND

Photolithography is the process by which semiconductor circuitry is patterned on a substrate such as a silicon wafer. A photolithography optical source provides the deep ultraviolet (DUV) light used to expose a photoresist on the wafer. One type of gas discharge light source used in photolithography is known as an excimer light source or laser. An excimer light source typically uses a gas mixture that is a combination of one or more noble gases, such as argon, krypton, or xenon, and a reactive species such as fluorine or chlorine. The excimer light source derives its name from the fact that under the appropriate condition of electrical stimulation (energy supplied) and high pressure (of the gas mixture), a pseudo-molecule called an excimer is created, which only exists in an energized state and gives rise to amplified light in the ultraviolet range. An excimer light source produces a light beam that has a wavelength in the deep ultraviolet (DUV) range and this light beam is used to pattern semiconductor substrates (or wafers) in a photolithography apparatus. The excimer light source can be built using a single gas discharge chamber or using a plurality of gas discharge chambers. The gas mixture in the gas discharge chamber may be exhausted from the gas discharge chamber or chambers.

SUMMARY

In one general aspect, an apparatus includes: a beam splitter on a beam path, the beam splitter configured to receive light from a deep ultraviolet (DUV) light source; and a first plurality of reflective optical elements on the beam path. The beam splitter is configured to direct a portion of the light received from the DUV light source toward the first plurality of reflective optical elements; the first plurality of reflective optical elements is configured to rotate a divergence of the portion of the light to produce rotated light; and the beam splitter is configured to direct the rotated light and a portion of the light received from the DUV light source onto an output beam path.

Implementations may include one or more of the following features. The apparatus also may include a polarization element on the beam path. The polarization element may be configured to change a polarization state of the rotated light such that, on the output beam path, the rotated light has the same polarization state as light received from the DUV light source. The apparatus also may include a second plurality of reflective optical elements on the beam path between the first plurality of optical elements and the polarization element. The first plurality of reflective optical elements may include four mirrors. The first plurality of reflective optical elements may be configured to rotate the divergence of the portion of the light by 90 degrees.

The light received from the DUV light source may have a vertical divergence having an initial vertical divergence value and a horizontal divergence having an initial horizontal divergence value, and, on the output beam path, the rotated light may have a horizontal divergence equal to the initial vertical divergence value and a vertical divergence equal to the initial horizontal divergence value. The rotated light and another portion of light from the DUV light source may be combined at the beam splitter to form an output beam that propagates on the output beam path, the output beam may have a vertical divergence value that is based on the vertical divergence of the rotated light and the vertical divergence of the other portion of light from the DUV light source, and a horizontal divergence value that is based on the horizontal divergence of the rotated light and the vertical divergence of the other portion of the light from the DUV light source. The horizontal divergence value of the output beam may be greater than the initial horizontal divergence value, and the vertical divergence value of the output beam may be less than the initial vertical divergence value. The light from the DUV light source may include at least a first pulse of light, the rotated light comprises a rotated pulse of light formed from reflection of a first portion of the first pulse of light, the other portion of light from the DUV light source comprises a transmitted second portion of the first pulse of light, and the output beam may be based on a reflection of the rotated pulse of light and the other portion.

The second plurality of reflective optical elements may include two or more mirrors. The polarization element may include a half waveplate or a phase retarding mirror. The beam path may be a closed path defined by the beam splitter, the first plurality of reflective optical elements, the second plurality of reflective optical elements, and the polarization element.

In another aspect, a deep ultraviolet (DUV) light source includes a light generation apparatus comprising at least one discharge chamber configured to hold a gaseous gain medium and to produce a DUV light beam; and an output beam formation apparatus including: a beam splitter on a beam path, the beam splitter configured to receive the DUV light beam; a polarization element on the beam path; and a first plurality of reflective optical elements on the beam path. The beam splitter is configured to direct a portion of the DUV light beam toward the first plurality of reflective optical elements; the first plurality of reflective optical elements is configured to rotate a divergence of the portion of light to produce rotated light; the waveplate is configured to change a polarization state of the rotated light such that, on the output beam path, the rotated light has the same polarization state as the DUV light beam; and the beam splitter is configured to form an output beam based on the rotated light and a portion of the DUV light beam.

Implementations may include one or more of the following features. The light generation apparatus may include: a first discharge chamber configured to hold a first gaseous gain medium and to produce a DUV seed light beam; and a second discharge chamber configured to hold a second gaseous gain medium and to amplify the seed light beam to form an amplified DUV light beam. The output beam formation apparatus may be configured to be positioned between the first discharge chamber and the second discharge chamber, and the DUV light may be the DUV seed light beam.

The DUV light source also may include a beam stretching apparatus configured to receive the output beam. The output beam formation apparatus may be between the light generation apparatus and the beam stretching apparatus.

The polarization element may be between a second plurality of reflective optical elements and the beam splitter.

In another aspect, a method for a deep ultraviolet (DUV) light source includes: receiving a portion of a DUV light beam, the portion of the DUV light beam having a polarization state, a vertical divergence of an initial vertical divergence value, and a horizontal divergence of an initial horizontal divergence value; rotating the portion of the DUV light beam to form a rotated light beam, the rotated light beam having a vertical divergence of the initial horizontal divergence value and a horizontal divergence of the initial vertical divergence value; passing the rotated light beam through an optical delay; forming an output light beam that propagates on an output beam path based on the rotated light beam and another portion of the DUV light beam.

Implementations may include one or more of the following features. In some implementations, before combining the rotated light beam and another portion of the DUV light beam, the rotated light beam is passed through a polarization element such that the rotated light beam and the other portion of the DUV light beam have the same polarization state on the output beam path.

The DUV light beam may include a pulsed DUV light beam, the rotated light beam comprises a reflection of a first one of the pulses in the pulsed DUV light beam, and the other portion of the DUV light beam may include part of the first one of the pulses.

Implementations of any of the techniques described above and herein may include a process, an apparatus, a system, and/or a method. The details of one or more implementations are set forth in the accompanying drawings and the description below. Other features will be apparent from the description and drawings, and from the claims.

DETAILED DESCRIPTION

Figure 1A:
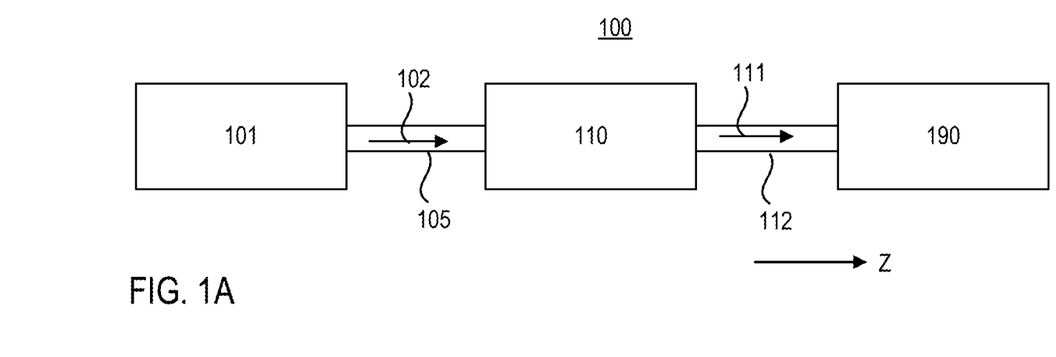
FIG. 1A is a block diagram of a system that includes an output formation apparatus.

Referring to FIG. 1A, a block diagram of a system 100 is shown. The system 100 includes a light source 101 that produces an input light beam 102, an output beam formation apparatus 110 that produces an output light beam 111, and an optical assembly 190 that receives the output light beam 111. The input light beam 102 propagates on an input path 105. The output beam propagates on an output path 112. The output beam formation apparatus 110 reduces the spatial coherence of the input light beam 102 by modulating a divergence of the input light beam 102. Modulating the divergence means rotating or otherwise changing the axis along which the least, minimum, or smallest divergence extends and/or the axis along which the greatest, highest, or maximum divergence extends by bending, folding, and/or redirecting the input light beam 102. In some implementations, the output beam formation apparatus 110 also maintains the polarization state of the input light beam 102 such that output light beam 111 has the same polarization state as the input light beam 102.

The optical assembly 190 is a deep ultraviolet (DUV) scanner apparatus (such as the lithography exposure apparatus 469 shown in FIG. 4A) that exposes a wafer with the output light beam 111 to form electronic features, or the optical assembly 190 is an intermediate optical element that directs and/or modifies the output light beam 111 before the output light beam 111 reaches the DUV scanner apparatus. For example, the optical assembly 190 may be an optical oscillator (such as the discharge chamber 565_2 shown in FIG. 5), a mirror, a lens, or a pulse stretcher between the output beam formation apparatus 110 and a DUV scanner apparatus. The input light beam 102 and the output light beam 111 are electromagnetic fields that may exhibit spatial and/or temporal coherence. An electromagnetic field has spatial coherence if the phase of the electromagnetic field is the same at different locations along the wavefront. The beam 102 has temporal coherence if the phase of the electromagnetic field at a single location is periodically the same at different times. When a light beam has spatial and/or temporal coherence, the wavefronts in the beam may randomly interfere with each other to produce speckle. The speckle causes spatial and/or temporal noise in the light beam, and the speckle may cause a speckle pattern that has a non-uniform intensity profile in the X-Y plane at the apparatus receiving the light beam (the optical assembly 190 in this example). The presence of speckle may cause the light at the optical assembly 190 to have a non-uniform intensity in the X-Y plane. This non-uniformity can result in uneven exposure of the wafer. For example, speckle may result in variation of the sizes of the exposed regions of photoresist that define the formation of microelectronic features, causing the features to be improperly formed and defective. Accordingly, for some applications, it is desirable to reduce spatial coherence.

Figure 1B:
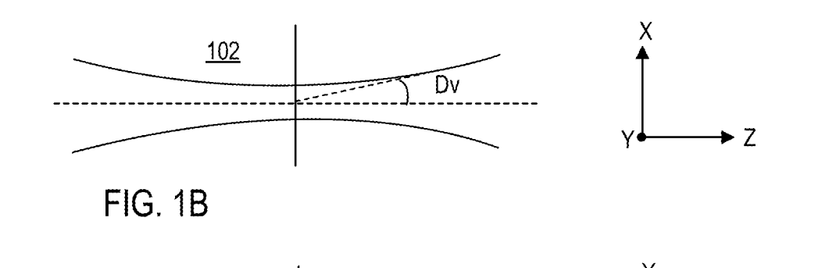
FIGS. 1B-1D show various views of an input light beam.
Figure 1C:
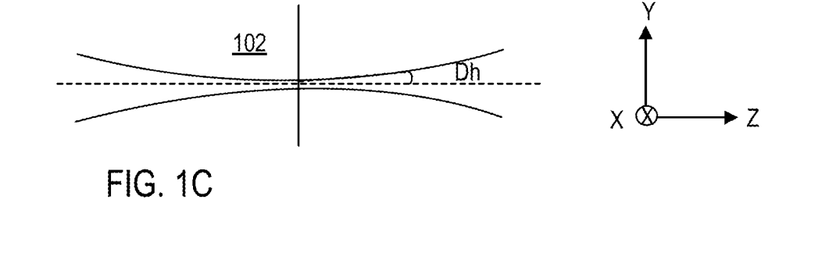
Figure 1D:
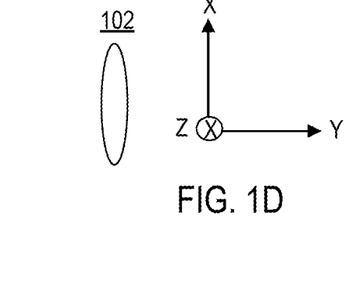

As discussed in greater detail below, the output beam formation apparatus 110 reduces the spatial coherence of the input light beam 102 by modulating the divergence of the input light beam 102. Divergence (or beam divergence) is an angular measure of the increase in beam diameter as a function of distance from a beam waist or from an aperture or source that emits the beam. The input light beam 102 propagates in the Z direction. The divergence of the input light beam 102 is different along two orthogonal axis in the X-Y plane, which is the plane that is orthogonal to the direction of propagation Z. FIGS. 1B-1D show various views of an example of the input light beam 102. The divergence of the input light beam 102 in two orthogonal planes is illustrated in FIGS. 1B and 1C. FIG. 1B is a cross-sectional view of the input light beam 102 in the X-Z plane. FIG. 1C is a cross-sectional view of the input light beam 102 in the Y-Z plane. The divergence of the input light beam 102 in X-Z plane is also called the vertical divergence and is labeled Dv in FIG. 1B. The divergence of the input light beam 102 in the Y-Z plane is also called the horizontal divergence and is labeled Dh in FIG. 1C. FIG. 1D shows the input light beam 102 in the X-Y plane. The spatial coherence of the input light beam 102 may be reduced by increasing the divergence of the input light beam 102. For example, increasing the divergence of the input light beam 102 along the Y axis reduces the horizontal spatial coherence (the spatial coherence along the Y axis).

In the example of FIGS. 1B-1D, the vertical divergence (Dv) of the input light beam 102 is greater than the horizontal divergence (Dh), and the input light beam 102 has an elliptical shape or profile in the X-Y plane. The input light beam 102 may have other profiles in the X-Y plane. For example, the input light beam 102 may have a rectangular shape in the X-Y plane.

The output beam formation apparatus 110 modulates the divergence of the input light beam 102 by rotating the input light beam 102 such that the axes along which the minimum and maximum divergence extend are modulated. For example, the output beam formation apparatus 110 may modulate the divergence of the input light beam 102 by rotating the axes of minimum and maximum divergence of each of a plurality of successive reflected portions of the input light beam 102 by 90°.

A light beam has divergence in all directions in the plane perpendicular to the direction of propagation. The divergence of the input light beam 102 has a greatest or maximum extent along one axis and a smallest or least extent along another axis. Referring to FIG. 1D, the maximum extent of the divergence or the maximum divergence of the input light beam 102 in the plane X-Y is along the X axis. The minimum, least, or smallest divergence of the input light beam 102 is along the Y axis. The output beam formation apparatus 110 rotates the divergence of the input light beam 102 by rotating the axes of the minimum and maximum divergence in the plane perpendicular to propagation. For example, in implementations in which the output beam formation apparatus 102 is configured to rotate the divergence of the input light beam 102 by 90°, the output beam formation apparatus 110 folds and changes the direction of the input light beam 102 such that the divergence of the light beam 102 is rotated by 90°. In this example, the output light beam 111 has an elliptical shape in the X-Y plane, but a maximum divergence along the Y axis and the minimum divergence along the X axis (thus, 90° rotated as compared to the divergence of the input beam). In this way, the divergence of the output light beam 111 at the optical assembly 190 is modulated as compared to the divergence in the input beam 102. By modulating the divergence, the spatial coherence is reduced in at least one direction.

The input light beam 102 may have any polarization state or may be unpolarized. Polarization is a parameter that describes the direction of oscillation of the electric field of a light beam. A type of polarization and a direction of polarization define a polarization state. The type of polarization may be linear, circular, elliptical, or random, or the light beam may be unpolarized. A light beam that is linearly polarized has an electric field that oscillates in a single plane that is constant over time, with the polarization state indicating the plane of oscillation. For linearly polarized light, the oscillations are confined to a single plane. Circularly polarized light has an electric field that describes a helix along the direction of propagation. Circularly polarized light may have different, orthogonal states. For example, circularly polarized light may be right-handed polarized light, in which the electric field rotates clockwise (as viewed from a point that receives the light), or left-hand polarized light, in which the electric field rotates counterclockwise (as viewed from a point that receives the light). In the examples discussed below, the input light beam 102 is linearly polarized along the Y axis.

Figure 2:
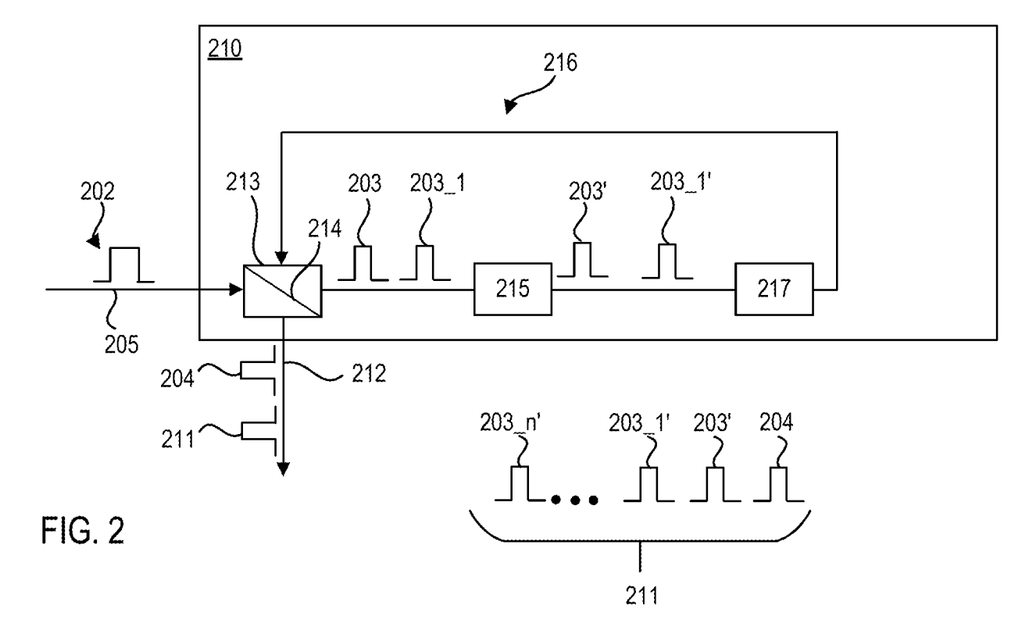
FIG. 2 is a block diagram of an output beam formation apparatus.

Referring to FIG. 2, a block diagram of an output beam formation apparatus 210 is shown. The output beam formation apparatus 210 is an implementation of the apparatus 110 (FIG. 1). The output beam formation apparatus 210 modulates the divergence of an input light beam 202 to produce an output light beam 211. The output light beam 211 may be provided to an optical assembly, such as the optical assembly 190 (FIG. 1). The input light beam 202 and the output light beam 211 are pulsed light beams.

The output beam formation apparatus 210 includes a beam splitting apparatus 213, a beam rotation apparatus 215, and a beam delay apparatus 217. The beam splitting apparatus 213, the beam rotation apparatus 215, and the beam delay apparatus 217 are on a beam path 216. The beam path 216 is a closed path. Light enters and exits the path 216 at the beam splitting apparatus 213. Light that enters the beam path 216 may traverse the beam path 216 more than once.

The beam splitting apparatus 213 is any optical element that is capable of splitting or dividing the input light beam 202. The beam splitting apparatus 213 may be, for example, a beam splitter. The beam splitting apparatus 213 includes an interface 214 that reflects some of the input light beam 202 onto an output beam path 212 and transmits the remainder onto the beam path 216. The beam splitting apparatus 213 divides the input light beam 202 into a first portion 203 and a second portion 204. The first portion 203 is the transmitted portion of the input light beam 202 and the second portion 204 is the reflected portion of the input light beam 202. In this example, the input light beam 202 is a pulse of light. The first portion 203 and the second portion 204 are also pulses of light, and each has an intensity that is determined by the beam splitting apparatus 213. For example, in implementations in which the beam splitting apparatus 213 reflects half of the incident light and transmits the remaining incident light, the first portion 203 and the second portion 204 have equal pulse energies.

The beam splitting apparatus 213 may be made of two prisms that are joined together at the interface 214. The amount of the input light beam 202 that is reflected depends on the material properties and construction of the beam splitting apparatus 213. For example, the beam splitting apparatus 213 may be configured to reflect half of incident light onto the output beam path 212 and to transmit the remainder onto the beam path 216. Although a negligible amount of light is absorbed or scattered by the beam splitting apparatus 213, the combined intensity of light transmitted and reflected by the beam splitting apparatus 213 at any given time is substantially equal to the intensity of the light incident on the beam splitting apparatus 213 at that time.

Figures 3A, 3B:
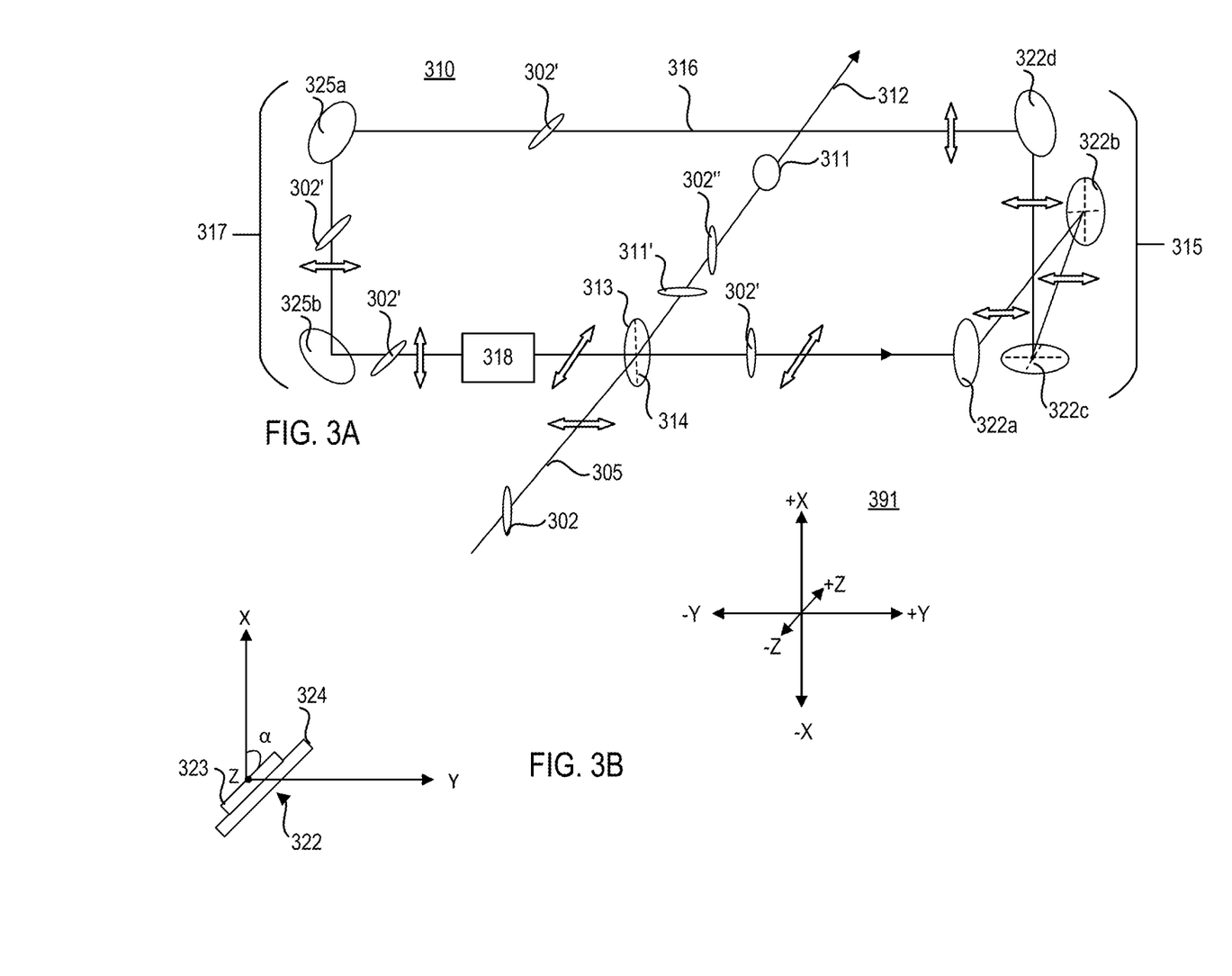
FIG. 3A is a block diagram of another output beam formation apparatus.
FIG. 3B is a block diagram of an optical element.

The beam rotation apparatus 215 is a plurality of optical elements that are arranged to rotate the beam divergence of the first portion 203. For example, the beam rotation apparatus 215 may include three or four reflective optical elements (such as mirrors) that fold and/or redirect the first portion 203 to form a rotated portion 203'. The greatest and least (or smallest) amounts of divergence of the rotated portion 203' are rotated relative to those of the first portion 203. For example, if the beam rotation apparatus 215 is configured to rotate the first portion 203 by 90°, then the rotated first portion 203' has a horizontal divergence that is equal to the vertical divergence of the first portion 203, and the rotated first portion 203' has a vertical divergence that is equal to the horizontal divergence of the first portion 203. The beam rotation apparatus 215 may direct the portion 203 in more than one direction to form the rotated portion 203'. For example, the beam rotation apparatus 215 may direct the first portion 203 out of the plane of the page. An implementation of the beam rotation apparatus 215 is shown in FIG. 3A.

The output beam formation apparatus 210 also includes the beam delay apparatus 217. The beam delay apparatus 217 determines the length of the beam path 216 and thus determines when the rotated portion 203' arrives at the beam splitting apparatus 213. The beam delay apparatus 217 is one or more optical elements on the beam path 216. For example, the beam delay apparatus 217 may include a plurality of reflective optical elements, such as mirrors. If the delay introduced by all of the optical elements that define the beam path 216 (including the beam delay apparatus 217) is less than the temporal duration of the input beam pulse 202, then the rotated portion 203' will partially overlap with the input beam pulse 202 in time. The beam delay apparatus 217 also steers the rotated portion 203' toward the beam splitter apparatus 215.

After passing through the beam delay apparatus 217, the rotated portion 203' is incident on the beam splitting apparatus 213. Some of the light in the rotated portion 203' is transmitted through the beam splitting apparatus 213 and onto the output beam path 212. The remainder of the rotated portion 203' is reflected onto the beam path 216 as portion 203_1. The portion 203_1 interacts with the beam rotation apparatus 215 and the beam delay apparatus 217 again to produce another rotated portion 203_1' that is returned to the beam splitter apparatus 213.

Some of the rotated portion 203_1' is transmitted onto the output beam path 212. Because the rotated portion 203_1' is based on a reflection of the rotated portion 203' and the rotated portion 203' is based on the input light beam 202, the divergence of the rotated portion 203' and the divergence of the rotated portion 203_1' are not the same. For example, if the direction of greatest divergence of the rotated portion 203' is 90° different than the direction of greatest divergence of the input light beam 202, the direction of greatest divergence of the rotated portion 203_1' is the same as the direction of greatest divergence of the input light beam 202, and so on. The intensity of each subsequent portion decreases depending on the reflection and transmission characteristics of the beam splitting apparatus 213. The output light beam 211 is formed from the light that is reflected or transmitted by the interface 214. Thus, the output light beam 211 includes the second portion 204 and the transmitted portion of the rotated portions 203', 203_1' . . . 203_n'. The divergence (and intensity) of these components varies, and the effect is that an assembly on the output beam path 212 (such as, for example, the optical assembly 190) receives the output light beam 211 with a modulated divergence. The modulated divergence results in the output light beam 211 having a lower spatial coherence along at least one direction.

Other implementations of the output beam formation apparatus 210 are possible. For example, the beam delay apparatus 217 may be between the beam splitting apparatus 213 and the beam rotation apparatus 215. In some implementations, the output beam formation apparatus 210 includes a polarization element on the beam path 216 that ensures that the polarization of the rotated portion 203' is the same as the input pulse 205. In another example, the beam splitting apparatus 213 may have a configuration other than the configuration shown in FIG. 2. For example, the beam splitting apparatus 214 may be arranged such that the portion 203 is formed by the beam splitting apparatus 213 reflecting part of the input light beam 202, and the second portion 204 is formed by the beam splitting apparatus 213 transmitting part of the input light beam 202.

Referring to FIG. 3A, a block diagram of another output beam formation apparatus 310 is shown. The output beam formation apparatus 310 is another example of an implementation of the output beam formation apparatus 110 (FIG. 1). The output beam formation apparatus 310 includes a beam splitting apparatus 313, a beam rotation apparatus 315, a beam delay apparatus 317, and a waveplate 318 that define an optical path 316. The waveplate 318 may be, for example, a half-waveplate or phase retarding mirror. The waveplate 318 is configured to change the polarization state of incident light into an orthogonal polarization state. For example, if the incident light on the waveplate 318 is horizontally linearly polarized, the light that exits the waveplate 318 is vertically linearly polarized. Light enters and exits the optical path 316 at the beam splitting apparatus 313. The optical path 316 is a closed path, and light may traverse the optical path 316 more than once. The output beam formation apparatus 310 forms an output light beam 311 based on an input light beam 302.

For the example of FIG. 3A, the X, Y, and Z axes are defined by a coordinate system 391. When discussing the orientation of various components and elements, the term axis encompasses directions that are away from and toward the origin. For example, an element that extends along the X axis may extend in the +X and −X directions. In the example discussed below, the input light beam 302 has a horizontal linear polarization state (the polarization vector is not along the X axis) and a greater beam divergence along the X axis than the Y axis. In FIG. 3A, the double-headed arrows indicate the polarization state.

An input light beam 302 propagates in the +Z direction and is incident on the beam splitting apparatus 313. The beam splitting apparatus 313 reflects and transmits light at an interface 314 based on the optical properties of the material or materials used in the beam splitting apparatus 313. The beam splitting apparatus 313 is any device that is capable of dividing incident light into a reflected portion and a transmitted portion. The beam splitting apparatus 313 is configured to transmit 50% of incident light and reflect 50% of incident light at an interface 314. The beam splitting apparatus 313 may be, for example, a non-polarizing cube beam splitter that includes two triangular prisms that are joined together. In this example, the plane at which the two triangular prisms are joined is the interface 314.

The beam splitting apparatus 313 and the optical elements that make up the beam rotation apparatus 315 and the beam delay apparatus 317 do not all have the same angle of incidence and may be rotated about the X, Y, or Z axis. In the discussion below, a nominal plane of an optical element is a plane near the active surface of that optical element, but from which the active surface of the optical element is rotated. Referring also to FIG. 3B, a block diagram of an optical element 322 is shown. The optical elements that make up the beam rotation apparatus 315, the beam delay apparatus 317, and the beam splitting apparatus 313 are similar to the optical element 322. The optical element includes an active surface 323 and a base 324. Together, the active surface 323 and the base 324 form the optical element 322. The optical element 322 may be implemented without the base 324. The active surface 323 is the portion of the optical element 322 that interacts with incident light. In the example of FIG. 3B, the active surface 323 is nominally in the X-Z plane and is rotated an angle α about the Z axis in the counterclockwise direction. In FIG. 3B, the +Z direction is into the page. In FIG. 3B and the discussion below, the rotation about an axis is given from the perspective of looking toward the origin.

The beam splitting apparatus 313 and the interface 314 are nominally in the X-Z plane and are rotated clockwise 45° about the X axis. A portion 302" of the input beam 302 is transmitted through the interface 314 onto the output beam path 312. The portion 302" forms part of the output light beam 311. The portion 302" has an intensity that is 50% of the intensity of the input light beam 302. The beam splitting apparatus 313 is non-polarizing. Thus, the polarization state of the portion 302" is the same as the polarization state of the input light beam 302. The divergence of the portion 302" is also the same as the divergence of the input beam 302. The interface 314 also reflects part of the input light beam as a portion 302'. The portion 302' is polarized along the Z axis and the greatest divergence is along the X axis. The portion 302' propagates along the +Y direction to the beam rotation apparatus 315.

The beam rotation apparatus 315 rotates the divergence of the portion 302'. The beam rotation apparatus 315 includes four reflective optical elements 322a, 322b, 322c, and 322d. Referring also to FIG. 3B, each of the reflective optical elements 322a, 322b, 322c, 322d includes a reflective surface that is similar to the active surface 323. Each reflective optical element 322a-322d may be, for example, a plane mirror that has a flat reflective surface that interacts with incident light. The reflective surface 323 is made of a material that reflects the wavelength or wavelengths of light in the input beam 302. The reflective surface 323 may be, for example, coated calcium fluoride (CaF) or fused silica. For simplicity, the individual reflective surfaces are not shown on the optical elements 322a. 322b, 322c, 322d in FIG. 3A. However, the reflective surfaces are the portions of the optical elements 322a, 322b, 322c, 322d that interact with light and define the portion of the beam path 316 that passes through the beam rotation apparatus 315. The optical elements 322a, 322c, and 322d and the beam splitting apparatus 313 are organized in a coplanar arrangement: each of the optical elements 322a, 322c, 322d has a reflective surface in the same X-Y plane as the beam splitting apparatus 313. The reflective surface of the optical element 322b is displaced from that X-Y plane in the +Z direction. The reflective surface of the optical elements 322a-322d are rotated relative to one of the axes in the coordinate system 391.

The reflective surface of the optical element 322a nominally extends in the X-Z plane and is rotated 45° clockwise about the X axis. The reflective surface of the optical element 322a is parallel to the interface 314 of the beam splitting apparatus 313. The center of the reflective surface of the optical element 322a and the center of the interface 314 are in the same X-Y plane. The reflective surface of the optical element 322b nominally extends in an X-Y plane that is displaced in the +Z direction relative to the X-Y plane that includes the centers of the reflective surface of the optical elements 322a and 322c. The reflective surface of the optical element 322b is rotated slightly about the X axis such that light incident on the optical element 322b is reflected toward the optical element 322c. The optical element 322c is close to the optical element 322a. The center of the reflective surface of the optical element 322c is in the same X-Y plane as the center of the reflective surface of the optical element 322a. The reflective surface of the optical element 322c nominally extends in the X-Y plane and is rotated 45° clockwise about the Y axis. The center of the reflective surface of the optical element 322d is in the same X-Y plane as the center of the reflective optical elements 322a and 322c. The reflective surface of the optical element 322d nominally extends in the X-Z plane and is rotated 45° clockwise about the Z axis.

An example of the portion 302' propagating through the beam rotating apparatus 315 is discussed next. In this example, the input beam 302 is linearly polarized along the Y axis and has a divergence that is greater along the X axis than the Y axis.

The interaction between the input beam 302 and the interface 314 produces the portion 302', which is a reflection of the input beam 302. The portion 302' propagates in the +Y direction. The portion 302' is linearly polarized along the Z axis. At the input to the beam rotation apparatus 315, the portion 302' and the light beam 302 have the same divergence along the X axis. The divergence of the portion 302' along the Z axis is the same as the divergence of the input light beam 302 along the Y axis. In other words, the greatest divergence of the portion 302' is along the X axis.

Of the optical elements 322a-322d that make up the beam rotation apparatus, the optical element 322a is closest to the beam splitting apparatus 313. Thus, the portion 302' interacts with the optical element 322a before interacting with the optical elements 322b-322d. The optical element 322a reflects the portion 302' in the +Z direction toward the optical element 322b. After interacting with the optical element 322a, the portion 302' is linearly polarized along the Y direction. The greatest divergence of the portion 302' is along the X axis immediately after interacting with the optical element 322a. The optical element 322b reflects the portion 302' in the −Z direction (or at a small angle relative to the Z direction) toward the optical element 322c. The greatest divergence of the portion 302' is along the X axis immediately after interacting with the optical element 322b. The optical element 322c reflects the portion 302' to the optical element 322d along the +X direction. After interacting with the optical element 322c, the direction of the greatest divergence of the portion 302' is along the Z axis. Thus, the optical element 322c rotates the divergence of the portion 302'. The portion 302' is reflected from the optical element 322d along the −Y direction. After interacting with the optical element 322d, the greatest divergence of the portion 302' is along the Z axis.

Thus, the beam rotating apparatus 315 rotates the divergence of the portion 302' by 90°. In this example, at the input of the beam rotating apparatus 315 (the optical element 322a), the portion 302' is propagating in the +Y direction, the greatest divergence is along the X axis, and the least (or smallest) divergence is along the Z axis. At the output of the beam rotating apparatus 315 (immediately after the optical element 322d), the portion 302' propagates in the −Y direction, the greatest divergence is along the Z axis, and the least (or smallest) divergence is along the X axis.

The optical elements 322a-322d are not polarizing elements, and the portion 30T remains linearly polarized while propagating through the beam rotation apparatus 315. The polarization of the portion 302' is defined relative to a surface on which the portion 302' is incident. Because the reflective surfaces of the optical elements 322a-322d do not all have the same angle of incidence, the axis of polarization of the portion 302' rotates in the beam rotation apparatus 315. The portion 302' is linearly polarized along the Z axis at the optical element 322a. The interaction with the optical element 322a rotates the polarization to the Y axis. The optical element 322b reflects the portion 302' back along the −Z direction and the portion 302' remains linearly polarized along the Y axis. The optical element 332c does not rotate the polarization of the portion 302'. However, the optical element 322d rotates the polarization from along the Y axis to along the X axis. Thus, the beam rotating apparatus 315 also changes the axis polarization of the portion 302'. In this example, the beam rotating apparatus 315 changes the polarization from along the Z axis at the input of the beam rotating apparatus 315 to along the X axis at the output of the beam rotating apparatus 315.

The output beam formation apparatus 310 also includes the delay apparatus 317. The delay apparatus 317 directs the portion 302' back to the beam splitting apparatus 313. The delay apparatus 317 is also used to determine the length of the optical path 316 and thereby controls when the portion 302' arrives at the beam splitting apparatus 313. For example, if the portion 302' (which is formed from a reflection of an input light pulse) is to be superimposed with a later-occurring portion of that same light pulse, then the delay apparatus 317 is configured such that the portion 302' reaches the beam splitting apparatus 313 before the end of the input light pulse. The output light beam 311 received by the optical assembly 190 is a pulse of light formed by the light that interacts with the beam splitting apparatus 313.

The delay apparatus 317 includes a reflective optical element 325a and a reflective optical element 325b. The reflective optical elements 325a, 325b are similar to the reflective optical elements 322a-322d. Each reflective optical element 325a, 325b includes a reflective surface similar to the reflective surface 323 (FIG. 3B). For simplicity, the reflective surfaces of the optical elements 325a, 325b are not shown in FIG. 3B. The reflective surface of the optical element 325a extends nominally in the X-Z plane and is rotated 45° counterclockwise about the Z axis. The reflective surface of the optical element 325b extends nominally in the X-Z plane and is rotated 45° clockwise about the Z axis. The reflective surface of the optical element 325a is orthogonal to the reflective surface of the optical element 322d. The reflective surface of the optical element 325b is parallel to the reflective surface of the optical element 322d. The centers of the reflective surfaces of the optical elements 322d, 325a, and 325h are in the same X-Y plane. The length of the optical path 316 may be adjusted by adjusting the distance between the optical elements 325a and 322d, and/or the distance between the optical elements 325a and 325b.

The optical element 325a is between the optical element 322d and the optical element 325b. The optical element 325a is displaced in the −Y direction relative to the optical element 322d and in the +X direction relative to the optical element 325h. The reflective surface of the optical element 325a receives the portion 302' from the optical element 322d. Prior to interacting with the optical element 352a, the portion 302' is linearly polarized along the X axis and the greatest divergence is along the Z axis. The optical element 325a reflects the portion 302' in the −X direction to the optical element 325b. The interaction with the optical element 325a rotates the polarization of the portion 302' to be along the Y axis but does not rotate the divergence. The portion 302' then interacts with the optical element 325b. The optical element 325b reflects the portion 302' along the +Y direction toward the beam splitting apparatus 313. The interaction with the optical element 325b rotates the polarization of the portion 302' to be along the X axis but does not rotate the divergence.

Thus, the portion 302' propagates in the +Y direction toward the beam splitting apparatus 313 with the greatest divergence along the Z axis and the polarization along the X axis. When the portion 302' reaches the interface 314, 50% of the portion 302' is reflected in the +Z direction and onto the output beam path 312. The reflected part of the portion 302' is labeled as 311'. The reflected portion 311' has the greatest divergence along the Y axis and the least divergence along the X axis. The output portion 311' and the portion 302" form the output light beam 311. The portion 302" has the greatest divergence along the X axis and the least (or smallest) divergence along the Y axis. On the other hand, the output portion 311' has the greatest divergence along the Y axis and the least (or smallest) divergence along the X axis. The output portion 311' adds divergence along the Y axis such that the output light beam 311 has a greater divergence along the Y axis and a smaller divergence along the X axis than the input beam 302. As a result, the output light beam 311 has a lower spatial coherence along the Y axis than the input beam 302 and thus has less noise along the Y axis than the input beam 302. In this way, the output beam formation apparatus 310 reduces speckle and improves the performance of the system 300.

In the discussion of the above example, the input light beam 302 propagates in the +Z direction, is linearly polarized along the Y axis, has a greatest divergence is along the X axis, and has a least divergence is along the Y axis. In other examples, an input light beam may be linearly polarized along some other axis perpendicular to the direction of propagation (or may have other polarization or lack of polarization), may have a greatest divergence along some other axis perpendicular to the direction of propagation, and may have a least divergence along some other axis that may or may not be perpendicular to the axis of greatest divergence.

The remaining light in the portion 302' is transmitted through the interface 314 and remains on the beam path 316. Light continues to circulate in the beam path 316 and is manipulated by the beam rotation apparatus 315 and the beam delay apparatus 317 as discussed above, and additional contributions to the output light beam 311 are made. For the example of FIG. 3 in which the beam splitting apparatus reflects 50% of incident light and transmits 50% of incident light, the divergence of the output light beam 311 is represented by Equations (1) and (2):

$$\text{Horizontal beam divergence} = \frac{2}{3}HDi + \frac{1}{3}VDi \quad (1)$$

$$\text{Vertical beam divergence} = \frac{2}{3}VDi + \frac{1}{3}HDi. \quad (2)$$

In Equations (1) and (2), HDi is the horizontal beam divergence of the input beam 302 in radians, and VDi is the vertical beam divergence of the input beam 302 in radians. The vertical beam divergence is the beam divergence along the X axis in the coordinate system 391. The horizontal beam divergence is the beam divergence along the Y axis in the coordinate system 391. For implementations in which the input beam 302 has the greatest divergence along the X axis, the output beam formation apparatus 310 reduces the divergence along the X axis and increases the divergence along the Y axis. Thus, in these implementations, the output beam formation apparatus 310 reduces the spatial coherence along the Y axis and the output light beam 311 has a lower spatial coherence along the Y axis (and less speckle) as compared to the input beam 302. For implementations in which the input beam 302 has the greatest divergence along the Y axis and the least divergence along the X axis, the output beam formation apparatus 310 reduces the divergence along the Y axis and increases the divergence along the X axis. In these implementations, the output beam formation apparatus 310 reduces the spatial coherence along the X axis.

The modulation of the divergence of the output light beam 311 occurs without regard to the polarization of the light that circulates on the path 316. In other words, the modulation of the divergence occurs regardless of the polarization state of the light that circulates on the path 216 and may be achieved with unpolarized light. Nonetheless, for some applications, it is desirable that the output light beam 311 have a particular polarization state. In these implementations, the output beam formation apparatus 310 may include the waveplate 318.

As discussed above, after interacting with the optical element 325b, the polarization of the portion 302' is along the X axis. The polarization of the input beam 302 is along the Y axis. The output beam formation apparatus 310 changes the divergence of the input beam 302 even if the portion 302' and the input beam 302 do not have the same polarization. However, for some applications, it is important that the output light beam 311 have the same polarization as the input beam 302. Thus, the output beam formation apparatus 310 may include a polarizing element that changes the polarization of the portion 302' without rotating or otherwise changing the divergence of the portion 302'. In the example of FIG. 3A, the output beam formation apparatus 310 includes the waveplate 318 to change the polarization of the portion 302' before the portion 302' reaches the beam splitting apparatus 313. The waveplate 318 is a half-wave plate that is positioned on the beam path 316. The portion 302' passes through the half-wave plate and the polarization is rotated by 90°. After passing through the waveplate 318, the portion 302' is polarized along the Z axis but the divergence is not changed. When the portion 302' reaches the beam splitting apparatus 313, the output portion 311' is reflected from the interface 314 and the polarization is rotated to be along the Y axis. Thus, the waveplate 318 changes the polarization of the portion 302' such that the polarization of the output portion 311' and the input beam 302 are the same, and the output light beam 311 has a constant polarization.

Figure 4A:
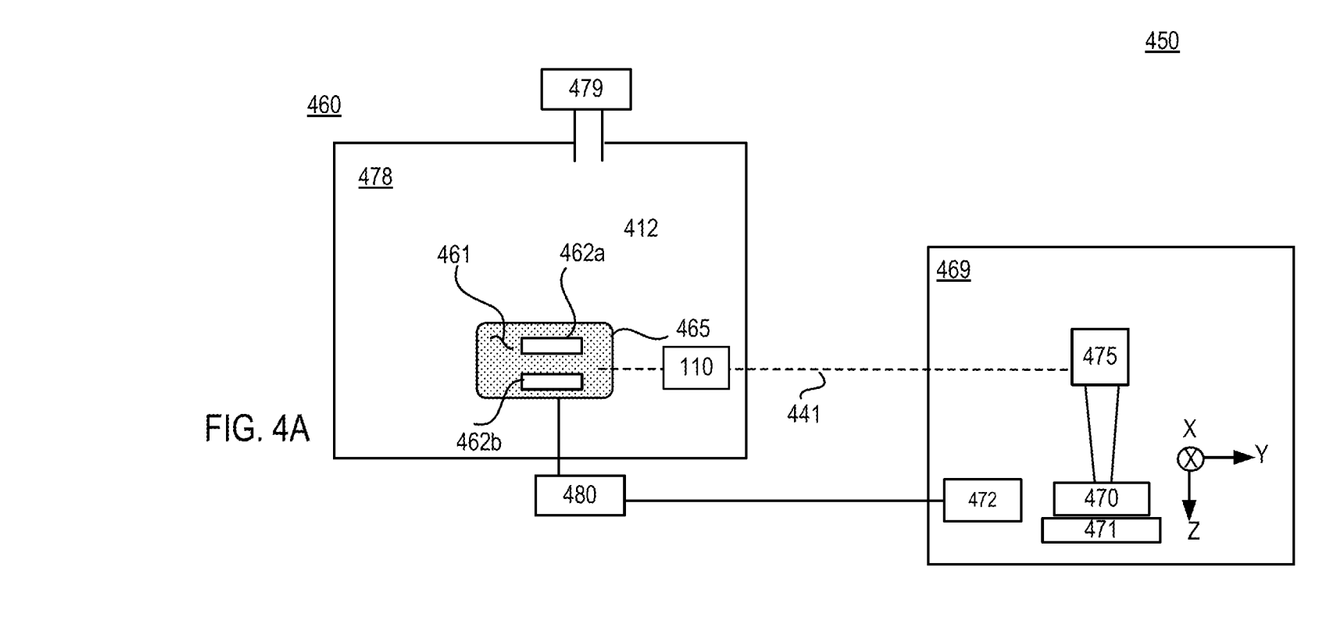
FIG. 4A is a block diagram of a photolithography system.
Figure 5:
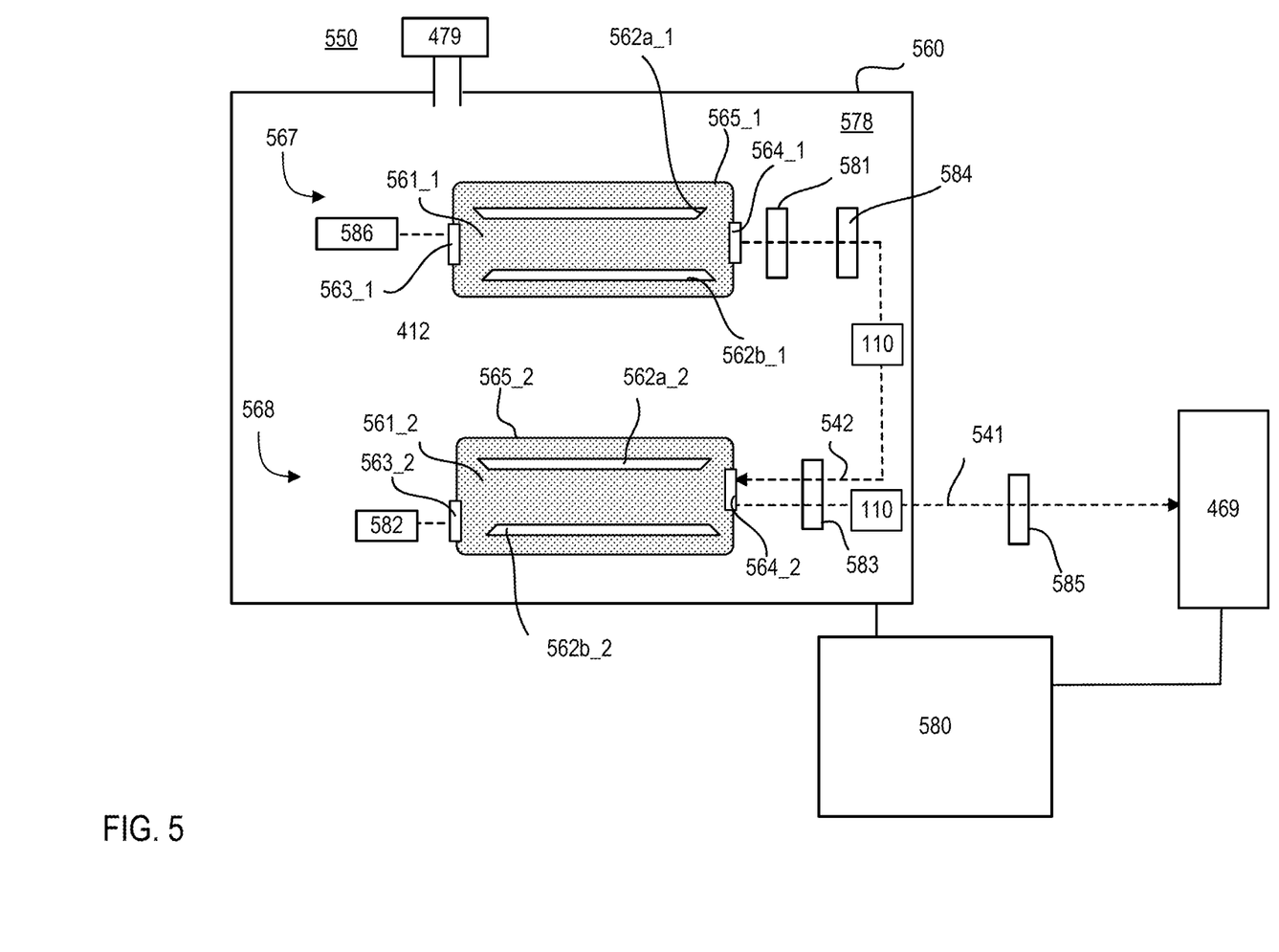
FIG. 5 is a block diagram of another photolithography system.

FIGS. 4A and 5 provide examples of DUV light sources 460 and 560, respectively, that may use the output beam formation apparatus 110, 210, and/or 310. The output beam formation apparatus 110, 210, or 310 may be placed at any one of the locations shown by the box element labeled 110.

Figure 4B:
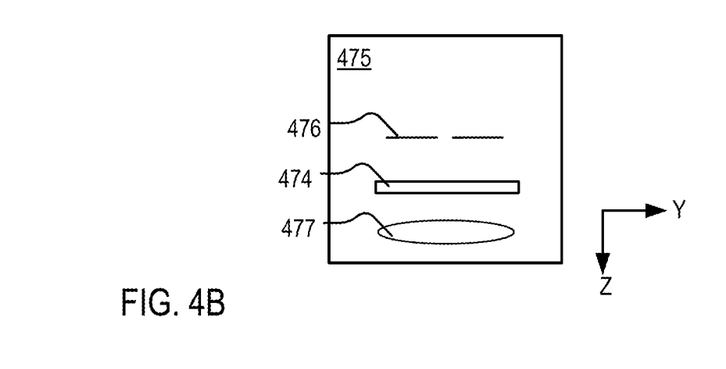
FIG. 4B is a block diagram of a projection optical system that may be used in the photolithography system of FIG. 4A.

Referring to FIGS. 4A and 4B, a photolithography system 450 includes the DUV light source 460 that provides a light beam 441 to a lithography exposure apparatus 469, which processes a wafer 470 received by a wafer holder or stage 471. The DUV light source 460 includes a discharge chamber 465, which encloses a gain medium 461, a cathode 462a, and an anode 462b. The gain medium 461 is a gaseous gain medium. The discharge chamber 465 is sealed such that the gain medium 461 remains in and is contained by the discharge chamber 465. Only one gas discharge chamber 465 is shown in FIG. 4A. However, the light source 460 may include more than one discharge chamber, such as shown in FIG. 5.

The DUV light source 460 also includes a gas management system 479. The gas management system 479 is in fluid communication with an interior 478 of the DUV light source 460. The gas management system 479 may include devices that manage the pressure and/or the fluid substances in the interior 478. For example, the gas management system 479 may include pumps, fans, filters, and/or other devices capable of managing gases and debris. The gas management system 479 may remove unwanted chemical substances, elements, or mixtures from the interior 478. For example, the gas management system 479 may purge out oxygen from the interior 478 using another chemical (in the form of a gas) such as, for example, nitrogen ($N_2$) or helium (He). The gas used by the gas management system 479 to remove the unwanted substances is referred to as a purge gas 412. Although the purge gas 412 is in the interior 478 and may surround the discharge chamber 465, the purge gas 412 does not penetrate the discharge chamber 465 and does not disturb or change the chemical composition of the gain medium 461. The light beam 441 propagates in the interior 478 and thus propagates in the purge gas 412.

The light beam 441 may be a pulsed light beam that includes pulses of light separated from each other in time. The lithography exposure apparatus 469 includes a projection optical system 475 through which the light beam 441 passes prior to reaching the wafer 470, and a metrology system 472. The metrology system 472 may include, for example, a camera or other device that is able to capture an image of the wafer 470 and/or the light beam 441 at the wafer 470, or an optical detector that is able to capture data that describes characteristics of the light beam 441, such as intensity of the light beam 441 at the wafer 470 in the x-y plane. The lithography exposure apparatus 469 may be a liquid immersion system or a dry system. The photolithography system 450 also includes a control system 480 to control the light source 460 and/or the lithography exposure apparatus 469.

Microelectronic features are formed on the wafer 470 by, for example, exposing a layer of radiation-sensitive photoresist material on the wafer 470 with the light beam 441. Referring also to FIG. 4B, the projection optical system 475 includes a slit 476, a mask 474, and a projection objective, which includes a lens system 477. The lens system 477 includes one or more reflective or refractive optical elements that are capable of interacting with light in the DUV range. The light beam 441 enters the optical system 475 and impinges on the slit 476, and at least some of the beam 441 passes through the slit 476. In the example of FIGS. 4A and 4B, the slit 476 is rectangular and shapes the light beam 441 into an elongated rectangular shaped light beam. The mask 474 includes a pattern, and this pattern determines which portions of the shaped light beam are transmitted by the mask 474 and which are blocked by the mask 474. The design of the pattern is determined by the specific microelectronic circuit design that is to be formed on the wafer 470.

In the example of FIG. 4, the output beam formation apparatus 110 is between the light source 460 and the lithography exposure apparatus 469. The output beam formation apparatus 110 receives the beam 441 and reduces the spatial coherence of the beam 441 before it is provided to the lithography exposure apparatus 469.

Referring to FIG. 5, a block diagram of a photolithography system 550 is shown. The system 550 is an example of an implementation of the system 450 (FIG. 4A). For example, in the photolithography system 550, a light source 560 is used as the light source 460 (FIG. 4A). The light source 560 produces a pulsed light beam 541, which is provided to the lithography exposure apparatus 469. The photolithography system 550 also includes a control system 580, which, in the example of FIG. 5, is connected to components of the optical source 560 as well as to the lithography exposure apparatus 469 to control various operations of the system 550. In other implementations, the control system 580 may be implemented as two separate control systems, one to control various aspects of the light source 560 and another to control the lithography exposure apparatus 469. In still other implementations, various other control systems 580 may be implemented.

In the example shown in FIG. 5, the light source 560 is a two-stage laser system that includes a master oscillator (MO) 567 that provides a seed light beam 542 to a power amplifier (PA) 568. The MO 567 and the PA 568 may be considered to be subsystems of the light source 560 or systems that are part of the light source 560. The PA 568 receives the seed light beam 542 from the MO 567 and amplifies the seed light beam 542 to generate the light beam 541 for use in the lithography exposure apparatus 469. For example, in some implementations, the MO 567 may emit a pulsed seed light beam, with seed pulse energies of approximately 1 milliJoule (mJ) per pulse, and these seed pulses may be amplified by the PA 568 to about 10 to 15 mJ.

The MO 567 includes a discharge chamber 565_1 having two elongated electrodes 562a_1 and 562b_1, a gain medium 561_1 that is a gas mixture, and a fan (not shown) for circulating the gas mixture between the electrodes 562a_1, 562b_1. A resonator is formed between a line narrowing module 586 on one side of the discharge chamber 565_1 and an output coupler 581 on a second side of the discharge chamber 565_1.

The discharge chamber 565_1 includes a first chamber window 563_1 and a second chamber window 564_1. The first and second chamber windows 563_1 and 564_1 are on opposite sides of the discharge chamber 565_1. The first and second chamber windows 563_1 and 564_1 transmit light in the DUV range and allow DUV light to enter and exit the discharge chamber 565_1.

The line narrowing module 586 may include a diffractive optic such as a grating that finely tunes the spectral output of the discharge chamber 565_1. The light source 560 also includes a line center analysis module 584 that receives an output light beam from the output coupler 581 and a beam coupling optical system 583. The line center analysis module 584 is a measurement system that may be used to measure or monitor the wavelength of the seed light beam 542. The line center analysis module 584 may be placed at other locations in the light source 560, or it may be placed at the output of the light source 560.

The gas mixture that is the gain medium 561_1 may be any gas suitable for producing a light beam at the wavelength and bandwidth required for the application. For an excimer source, the gas mixture 561_1 may contain a noble gas (rare gas) such as, for example, argon or krypton, a halogen, such as, for example, fluorine or chlorine and traces of xenon apart from a buffer gas, such as helium. Specific examples of the gas mixture include argon fluoride (ArF), which emits light at a wavelength of about 193 nm, krypton fluoride (KrF), which emits light at a wavelength of about 248 nm, or xenon chloride (XeCl), which emits light at a wavelength of about 351 nm. Thus, the light beams 541 and 542 include wavelengths in the DUV range in this implementation. The excimer gain medium (the gas mixture) is pumped with short (for example, nanosecond) current pulses in a high-voltage electric discharge by application of a voltage to the elongated electrodes 562a_1, 562b_1.

The PA 568 includes a beam coupling optical system 583 that receives the seed light beam 542 from the MO 567 and directs the seed light beam 542 through a discharge chamber 565_2, and to a beam turning optical element 582, which modifies or changes the direction of the seed light beam 542 so that it is sent back into the discharge chamber 565_2. The beam turning optical element 582 and the beam coupling optical system 583 form a circulating and closed loop optical path in which the input into a ring amplifier intersects the output of the ring amplifier at the beam coupling optical system 583.

The discharge chamber 565_2 includes a pair of elongated electrodes 562a_2, 562b_2, a gain medium 561_2, and a fan (not shown) for circulating the gain medium 561_2 between the electrodes 562a_2, 562b_2. The gas mixture that forms the gain medium 561_2 may be the same as the gas mixture that forms gain medium 561_1.

The discharge chamber 565_2 includes a first chamber window 563_2 and a second chamber window 564_2. The first and second chamber windows 563_2 and 564_2 are on opposite sides of the discharge chamber 565_2. The first and second chamber windows 563_2 and 564_2 transmit light in the DUV range and allow DUV light to enter and exit the discharge chamber 565_2.

The output light beam 541 may be directed through a beam preparation system 585 prior to reaching the lithography exposure apparatus 469. The beam preparation system 585 may include a bandwidth analysis module that measures various parameters (such as the bandwidth or the wavelength) of the beam 541. The beam preparation system 585 also may include a pulse stretcher (not shown) that stretches each pulse of the output light beam 541 in time. The beam preparation system 585 also may include other components that are able to act upon the beam 541 such as, for example, reflective and/or refractive optical elements (such as, for example, lenses and mirrors), filters, and optical apertures (including automated shutters).

The DUV light source 560 also includes the gas management system 479, which is in fluid communication with an interior 578 of the DUV light source 560. As discussed above, the gas management system 479 provides the purge gas 412 to the interior 578. In the example of FIG. 5, the purge gas 412 surrounds the chambers 565_1 and 565_2 and also surrounds optical components of some of the subsystems of the DUV light source 560. For example, the purge gas 412 surrounds the optical components in the line narrowing module 586, output coupler 581, the line center analysis module 584, the beam coupling optical system 583, and the beam turning optical element 582. Although the purge gas 412 is in the interior 578 and surrounds the discharge chambers 565_1 and 565_2 and various other optical components, the purge gas 412 does not penetrate the discharge chambers 565_1 and 565_2 and does not disturb or change the chemical composition of the gain mediums 561_1 and 561_2.

The photolithography system 550 also includes the control system 580. The control system 580 may control when the light source 560 emits a pulse of light or a burst of light pulses that includes one or more pulses of light by sending one or more signals to the light source 560. The control system 580 is also connected to the lithography exposure apparatus 469. Thus, the control system 580 also may control the various aspects of the lithography exposure apparatus 469. For example, the control system 580 may control the exposure of the wafer 470 (FIG. 4A) and thus may be used to control how electronic features are printed on the wafer 470. In some implementations, the control system 580 may control the scanning of the wafer 470 by controlling the motion of the slit 476 in the x-y plane (FIG. 4B). Moreover, the control system 580 may exchange data with the metrology system 472 and/or the optical system 475 (FIG. 4B).

The lithography exposure apparatus 469 also may include, for example, temperature control devices (such as air conditioning devices and/or heating devices), and/or power supplies for the various electrical components. The control system 580 also may control these components. In some implementations, the control system 580 is implemented to include more than one sub-control system, with at least one sub-control system (a lithography controller) dedicated to controlling aspects of the lithography exposure apparatus 469. In these implementations, the control system 580 may be used to control aspects of the lithography exposure apparatus 469 instead of, or in addition to, using the lithography controller.

When the gain medium 561_1 or 561_2 is pumped by applying voltage to the electrodes 562a_1, 562b_1 or 562a_2, 562b_2, respectively, the gain medium 561_1 and/or 561_2 emits light. When voltage is applied to the electrodes at regular temporal intervals, the light beam 541 is pulsed. Thus, the repetition rate of the pulsed light beam 541 is determined by the rate at which voltage is applied to the electrodes. The repetition rate of the pulses may range between about 500 and 6,000 Hz for various applications. In some implementations, the repetition rate may be greater than 6,000 Hz, and may be, for example, 12,000 Hz or greater, but other repetition rates may be used in other implementations.

The output beam formation apparatus 110 (or 210 or 310) may be placed between the discharge chambers 565_1 and 565_2 or between the discharge chamber 565_2 and the lithography apparatus 469. In implementations that include the beam preparation system 585 the output beam formation apparatus 110 (or 210 or 310) may be placed between the discharge chamber 565_2 and the beam preparation system 585.

Other aspects of the invention are set out in the following numbered clauses.

1. An apparatus comprising:
a beam splitter on a beam path, the beam splitter configured to receive light from a deep ultraviolet (DUV) light source; and
a first plurality of reflective optical elements on the beam path, wherein the beam splitter is configured to direct a portion of the light received from the DUV light source toward the first plurality of reflective optical elements;
the first plurality of reflective optical elements is configured to rotate a divergence of the portion of the light to produce rotated light; and
the beam splitter is configured to direct the rotated light and a portion of the light received from the DUV light source onto an output beam path.

2. The apparatus of clause 1, further comprising a polarization element on the beam path, wherein the polarization element is configured to change a polarization state of the rotated light such that, on the output beam path, the rotated light has the same polarization state as light received from the DUV light source.

3. The apparatus of clause 2, further comprising a second plurality of reflective optical elements on the beam path between the first plurality of optical elements and the polarization element.

4. The apparatus of clause 3, wherein the first plurality of reflective optical elements comprises four mirrors.

5. The apparatus of clause 1, wherein the first plurality of reflective optical elements is configured to rotate the divergence of the portion of the light by 90 degrees.

6. The apparatus of clause 1, wherein the light received from the DUV light source has a vertical divergence having an initial vertical divergence value and a horizontal divergence having an initial horizontal divergence value, and, on the output beam path, the rotated light has a horizontal divergence equal to the initial vertical divergence value and a vertical divergence equal to the initial horizontal divergence value.

7. The apparatus of clause 6, wherein the rotated light and another portion of light from the DUV light source are combined at the beam splitter to form an output beam that propagates on the output beam path, the output beam has a vertical divergence value that is based on the vertical divergence of the rotated light and the vertical divergence of the other portion of light from the DUV light source, and a horizontal divergence value that is based on the horizontal divergence of the rotated light and the vertical divergence of the other portion of the light from the DUV light source.

8. The apparatus of clause 7, wherein the horizontal divergence value of the output beam is greater than the initial horizontal divergence value, and the vertical divergence value of the output beam is less than the initial vertical divergence value.

9. The apparatus of clause 8, wherein the light from the DUV light source comprises at least a first pulse of light, the rotated light comprises a rotated pulse of light formed from reflection of a first portion of the first pulse of light, the other portion of light from the DUV light source comprises a transmitted second portion of the first pulse of light, and the output beam is based on a reflection of the rotated pulse of light and the other portion.

10. The apparatus of clause 3, wherein the second plurality of reflective optical elements comprises two or more mirrors.

11. The apparatus of clause 2, wherein the polarization element comprises a half waveplate or a phase retarding mirror.

12. The apparatus of clause 2, wherein the beam path is a closed path defined by the beam splitter, the first plurality of reflective optical elements, the second plurality of reflective optical elements, and the polarization element.

13. A deep ultraviolet (DUV) light source comprising:
a light generation apparatus comprising at least one discharge chamber configured to hold a gaseous gain medium and to produce a DUV light beam; and
an output beam formation apparatus comprising:
a beam splitter on a beam path, the beam splitter configured to receive the DUV light beam;
a polarization element on the beam path; and
a first plurality of reflective optical elements on the beam path, wherein
the beam splitter is configured to direct a portion of the DUV light beam toward the first plurality of reflective optical elements;
the first plurality of reflective optical elements is configured to rotate a divergence of the portion of light to produce rotated light;
the waveplate is configured to change a polarization state of the rotated light such that, on the output beam path, the rotated light has the same polarization state as the DUV light beam;
and
the beam splitter is configured to form an output beam based on the rotated light and a portion of the DUV light beam.

14. The DUV light source of clause 13, wherein the light generation apparatus comprises: a first discharge chamber configured to hold a first gaseous gain medium and to produce a DUV seed light beam; and
a second discharge chamber configured to hold a second gaseous gain medium and to amplify the seed light beam to form an amplified DUV light beam.

15. The DUV light source of clause 14, wherein the output beam formation apparatus is configured to be positioned between the first discharge chamber and the second discharge chamber, and the DUV light comprises the DUV seed light beam.

16. The DUV light source of clause 13, further comprising a beam stretching apparatus configured to receive the output beam.

17. The DUV light source of clause 16, wherein the output beam formation apparatus is between the light generation apparatus and the beam stretching apparatus.

18. The DUV light source of clause 13, wherein the polarization element is between a second plurality of reflective optical elements and the beam splitter.

19. A method for a deep ultraviolet (DUV) light source, the method comprising:
receiving a portion of a DUV light beam, the portion of the DUV light beam having a polarization state, a vertical divergence of an initial vertical divergence value, and a horizontal divergence of an initial horizontal divergence value;
rotating the portion of the DUV light beam to form a rotated light beam, the rotated light beam having a vertical divergence of the initial horizontal divergence value and a horizontal divergence of the initial vertical divergence value;
passing the rotated light beam through an optical delay;
forming an output light beam that propagates on an output beam path based on the rotated light beam and another portion of the DUV light beam.

20. The method of clause 19, further comprising, before combining the rotated light beam and another portion of the DUV light beam, passing the rotated light beam through a polarization element such that the rotated light beam and the other portion of the DUV light beam have the same polarization state on the output beam path.

21. The method of clause 19, wherein the DUV light beam comprises a pulsed DUV light beam, the rotated light beam comprises a reflection of a first one of the pulses in the pulsed DUV light beam, and the other portion of the DUV light beam comprises part of the first one of the pulses.

Still other implementations are within the scope of the claims.

What is claimed is:

1. An apparatus comprising:
a beam splitter on a beam path, the beam splitter configured to receive light from a deep ultraviolet (DUV) light source; and
a beam rotation device comprising a first plurality of reflective optical elements on the beam path, wherein
the beam splitter is configured to direct a portion of the light received from the DUV light source toward the first plurality of reflective optical elements;
the beam rotation device is configured to reduce a spatial coherence of the light received from the DUV light source by rotating a divergence of the portion of the light to produce rotated light; and
the beam splitter is configured to direct the rotated light and a portion of the light received from the DUV light source onto an output beam path.

2. The apparatus of claim 1, further comprising a polarization element on the beam path, wherein the polarization element is configured to change a polarization state of the rotated light such that, on the output beam path, the rotated light has the same polarization state as light received from the DUV light source.

3. The apparatus of claim 2, further comprising a second plurality of reflective optical elements on the beam path between the first plurality of reflective optical elements and the polarization element.

4. The apparatus of claim 3, wherein the first plurality of reflective optical elements comprises four mirrors.

5. The apparatus of claim 1, wherein the first plurality of reflective optical elements is configured to rotate the divergence of the portion of the light by 90 degrees.

6. The apparatus of claim 1, wherein the light received from the DUV light source has a vertical divergence having an initial vertical divergence value and a horizontal divergence having an initial horizontal divergence value, and, on the output beam path, the rotated light has a horizontal divergence equal to the initial vertical divergence value and a vertical divergence equal to the initial horizontal divergence value.

7. The apparatus of claim 6, wherein the rotated light and another portion of light from the DUV light source are combined at the beam splitter to form an output beam that propagates on the output beam path, the output beam has a vertical divergence value that is based on the vertical divergence of the rotated light and the vertical divergence of the other portion of light from the DUV light source, and a horizontal divergence value that is based on the horizontal divergence of the rotated light and the vertical divergence of the other portion of the light from the DUV light source.

8. The apparatus of claim 7, wherein the horizontal divergence value of the output beam is greater than the initial horizontal divergence value, and the vertical divergence value of the output beam is less than the initial vertical divergence value.

9. The apparatus of claim 8, wherein the light from the DUV light source comprises at least a first pulse of light, the rotated light comprises a rotated pulse of light formed from reflection of a first portion of the first pulse of light, the other portion of light from the DUV light source comprises a transmitted second portion of the first pulse of light, and the output beam is based on a reflection of the rotated pulse of light and the other portion.

10. The apparatus of claim 3, wherein the second plurality of reflective optical elements comprises two or more mirrors.

11. The apparatus of claim 2, wherein the polarization element comprises a half waveplate or a phase retarding mirror.

12. The apparatus of claim 3, wherein the beam path is a closed path defined by the beam splitter, the first plurality of reflective optical elements, the second plurality of reflective optical elements, and the polarization element.

13. A deep ultraviolet (DUV) light source comprising:
a light generation apparatus comprising at least one discharge chamber configured to hold a gaseous gain medium and to produce a DUV light beam; and
an output beam formation apparatus comprising:
a beam splitter on a beam path, the beam splitter configured to receive the DUV light beam;
a polarization element on the beam path;
a beam delay apparatus on the beam path; and
a first plurality of reflective optical elements on the beam path, wherein
the beam splitter is configured to direct a portion of the DUV light beam toward the first plurality of reflective optical elements;
the first plurality of reflective optical elements is configured to rotate a divergence of the portion of light to produce rotated light;

the polarization element is configured to change a polarization state of the rotated light;

the beam delay apparatus is configured to direct the rotated light toward the polarization element and the beam splitter; and the beam splitter is configured to form an output beam based on the rotated light.

14. The DUV light source of claim 13, wherein the light generation apparatus comprises:

a first discharge chamber configured to hold a first gaseous gain medium and to produce a DUV seed light beam; and a second discharge chamber configured to hold a second gaseous gain medium and to amplify the DUV seed light beam to form an amplified DUV light beam.

15. The DUV light source of claim 14, wherein the output beam formation apparatus is configured to be positioned between the first discharge chamber and the second discharge chamber, and the DUV light comprises the DUV seed light beam.

16. The DUV light source of claim 13, further comprising a beam stretching apparatus configured to receive the output beam.

17. The DUV light source of claim 16, wherein the output beam formation apparatus is between the light generation apparatus and the beam stretching apparatus.

18. The DUV light source of claim 13, wherein the polarization element is between the beam delay apparatus and the beam splitter.

19. A method for a deep ultraviolet (DUV) light source, the method comprising:

receiving a portion of a DUV light beam, the portion of the DUV light beam having a polarization state, a vertical divergence of an initial vertical divergence value, and a horizontal divergence of an initial horizontal divergence value;

rotating the portion of the DUV light beam to form a rotated light beam, the rotated light beam having a vertical divergence of the initial horizontal divergence value and a horizontal divergence of the initial vertical divergence value;

passing the rotated light beam through an optical delay;

forming an output light beam that propagates on an output beam path based on-the rotated light beam and another portion of the DUV light beam.

20. The method of claim 19, further comprising, before combining the rotated light beam and another portion of the DUV light beam, passing the rotated light beam through a polarization element such that the rotated light beam and the other portion of the DUV light beam have the same polarization state on the output beam path.

21. The method of claim 19, wherein the DUV light beam comprises a pulsed DUV light beam comprising pulses, the rotated light beam comprises a reflection of a first one of the pulses in the pulsed DUV light beam, and the other portion of the DUV light beam comprises part of the first one of the pulses.

22. The apparatus of claim 1, wherein at least three of the first plurality of reflective optical elements comprise a reflective surface configured for positioning in a common plane and at least one of the first plurality of reflective optical elements comprises a reflective optical surface configured to be displaced from the common plane.

23. The DUV light source of claim 13, wherein the output beam propagates on an output beam path; and the polarization element is configured to change a polarization state of the rotated light such that, on the output beam path, the rotated light has the same polarization state as the DUV light beam.

* * * * *